(12) United States Patent
Ruka et al.

(10) Patent No.: US 8,211,587 B2
(45) Date of Patent: Jul. 3, 2012

(54) PLASMA SPRAYED CERAMIC-METAL FUEL ELECTRODE

(75) Inventors: Roswell J. Ruka, Pittsburgh, PA (US); George R. Folser, Lower Burrell, PA (US); Srikanth Gopalan, Norwood, MA (US)

(73) Assignee: Siemens Energy, Inc., Orlando, FL (US)

( * ) Notice: Subject to any disclaimer, the term of this patent is extended or adjusted under 35 U.S.C. 154(b) by 1780 days.

(21) Appl. No.: 10/663,949

(22) Filed: Sep. 16, 2003

(65) Prior Publication Data

US 2005/0058883 A1 Mar. 17, 2005

(51) Int. Cl.
*H01M 8/12* (2006.01)
*H01M 4/88* (2006.01)

(52) U.S. Cl. ......... 429/486; 429/482; 429/497; 429/535

(58) Field of Classification Search .................... 429/12, 429/40, 41, 46
See application file for complete search history.

(56) References Cited

U.S. PATENT DOCUMENTS

| | | |
|---|---|---|
| 3,220,068 A | 11/1965 | Geisen, Jr. |
| 3,591,759 A | 7/1971 | Stand |
| 3,823,302 A | 7/1974 | Muehlberger |
| 3,839,618 A | 10/1974 | Muehlberger |
| 4,049,841 A | 9/1977 | Coker et al. |
| 4,330,568 A | 5/1982 | Boehm et al. |
| 4,582,766 A | 4/1986 | Isenberg et al. |
| 4,597,170 A | 7/1986 | Isenberg |
| 4,598,467 A | 7/1986 | Isenberg et al. |
| 4,609,562 A | 9/1986 | Isenberg et al. |
| 4,847,172 A | 7/1989 | Maskalick et al. |
| 4,853,250 A | 8/1989 | Boulos et al. |
| 4,971,830 A | 11/1990 | Jensen |
| 5,035,962 A * | 7/1991 | Jensen ............................ 429/40 |
| 5,085,742 A | 2/1992 | Dollard et al. |
| 5,106,706 A | 4/1992 | Singh et al. |
| 5,234,722 A | 8/1993 | Ito et al. |
| H1260 H | 12/1993 | Towe |
| 5,418,081 A | 5/1995 | Kawasaki et al. |
| 5,426,003 A | 6/1995 | Spengler et al. |
| 5,480,739 A | 1/1996 | Kawasaki et al. |
| 5,516,597 A | 5/1996 | Singh et al. |
| 5,527,633 A | 6/1996 | Kawasaki et al. |
| 5,529,856 A | 6/1996 | Petri et al. |
| 5,589,285 A * | 12/1996 | Cable et al. ..................... 429/13 |
| 5,716,422 A | 2/1998 | Muffoletto et al. |
| 5,908,713 A | 6/1999 | Ruka et al. |
| 5,985,476 A | 11/1999 | Wachsman et al. |
| 5,993,989 A | 11/1999 | Baozhen et al. |
| 6,139,985 A | 10/2000 | Borglum et al. |

(Continued)

OTHER PUBLICATIONS

Ed. Drew, R.A.L.; Pugh; Brochu. Metal/Ceramic Interactions, Proceedings of the International Symposium on Metal/Ceramic Interactions, Montreal. Aug. 11-14, 2002. Canadian Institute of Mining, Metallurgy, and Petroleum. 231-243.*

(Continued)

*Primary Examiner* — Keith Walker

(57) ABSTRACT

A plasma sprayed ceramic-metal fuel electrode is provided. The fuel electrode has particular application in connection with a solid oxide fuel cell used within a power generation system. The fuel cell advantageously comprises an air electrode, an electrolyte formed on at least a portion of the air electrode, a plasma sprayed ceramic-metal fuel electrode formed on at least a portion of the electrolyte, and an interconnect layer to connect adjacent cells in a generator.

6 Claims, 4 Drawing Sheets

U.S. PATENT DOCUMENTS

| | | | |
|---|---|---|---|
| 6,248,468 B1 | 6/2001 | Ruka et al. | |
| 2003/0015431 A1* | 1/2003 | Barker et al. | 205/170 |
| 2004/0018409 A1* | 1/2004 | Hui et al. | 429/33 |
| 2004/0058225 A1* | 3/2004 | Schmidt et al. | 429/40 |

OTHER PUBLICATIONS

Ed. Drew, R.A.L.; Pugh; Brochu. Metal/ceramic Interactions. Proceedings of the International Symposium on Metal/ceramic Interactions, Montreal. Aug. 11-14, 2002. Canadian Institute of Mining, Metallurgy, and Petroleum. 231-243.*

Wachtman, J. B. and Haber, eds. Ceramic Film Coatings. 1993. William Andrew Publishing/Noyes. pp. 131, 138, 139.*

Ramanarayanan, S.C. et al. High Temperature Ion Conducting Ceramics. The Electrochemical Society Interface. Summer 2001. pp. 22-24.*

R.M.C. Clemmer, S.F. Corbin, X. Qiao; "Influence of Nickel Distribution of the Processing and Properties of Porous Metal/Ceramic Composite Fuel Cells"; Processing and Fabrication of Advanced Materials X, ASM International 2001, Nov. 5-8, 2001.*

Application of Plasma Spraying to Tubular-Type Solid Oxide Fuel Cells Production; H. Tsukuda, A. Notomi, N. Hisatome; Journal of Thermal Spray Technology; vol. 9, No. 3; Sep. 2000; pp. 364-368.*

\* cited by examiner

PLASMA SPRAYED CERAMIC-METAL FUEL ELECTRODE

GOVERNMENT RIGHTS STATEMENT

This invention was conceived under United States Department of Energy Contract No. DE-FC26-97FT-34139. The United States government has certain rights hereunder.

FIELD OF THE INVENTION

The present invention relates in general to the fields of plasma spraying and ceramic-metal fuel electrodes and, in particular, to a method forming a solid oxide fuel cell used within a power generation system by plasma spraying a nickel-zirconia fuel electrode onto an underlying electrolyte.

BACKGROUND OF THE INVENTION

A fuel cell converts chemical energy directly into electrical energy. Most fuel cells comprise a cathode or air electrode 1 and an anode or fuel electrode 3, separated by an electrolyte 5 (FIG. 1). At the air electrode, oxygen is ionized and the oxide ions migrate through the electrolyte to the fuel electrode 3. At the fuel electrode 3, hydrogen is ionized and the hydrogen ions react with the oxide ions to form water and release electrons. The released electrons then travel from the fuel electrode 3 to the air electrode 1 through a load-containing connection, thereby completing the circuit and providing a small amount of direct electrical current. It is well known in the art that ion quantities can vary, additional or other ion constituents can be used, and ion and electron directions can be reversed.

A fuel cell based power generation system typically comprises a plurality of electrically interconnected fuel cells. The system usually uses a hydrogen-bearing and/or carbon-bearing fuel (e.g. natural gas, methane, carbon monoxide, hydrogen) at the anode, and an oxidant (e.g. air, oxygen) at the cathode. A schematic arrangement of one such system, which uses solid oxide electrolyte fuel cells (SOFC), is described in U.S. Pat. No. 4,395,468.

Because fuel cells are efficient, use plentiful and renewable fuels, do not require direct combustion and produce low emissions, they are a very attractive energy source. However, although the basic electrochemical processes and schematic arrangement of fuel cell based power generation systems are well understood, engineering solutions necessary to lower fabrication costs and make such systems an economical alternative to fossil fuel and other power generation systems remain elusive.

One technical problem with conventional fuel cells involves the application of the fuel electrode to the electrolyte. The applied fuel electrode should advantageously possess and maintain certain properties during a lifetime of operation under fuel cell operating conditions with various fuels, including varying temperatures (e.g. about 25-1200° C., preferably about 700-1000° C.) and pressures (e.g. about 0.5-5 atm, preferably about 1-5 atm). These properties include: high electrical conductivity, large electrochemically active interface area, high porosity, strong adherence to the electrolyte and interconnect, good chemical and physical stability, thermal cyclability, low fabrication costs, and long useful life.

One popular type of fuel electrode composition is a nickel-zirconia cermet (ceramic-metal mixture) such as those described in U.S. Pat. Nos. 4,597,170, 4,609,562, and 4,847,172. A successful process used to apply a nickel-zirconia fuel electrode onto an underlying electrolyte substrate involves the electrochemical vapor deposition (EVD) of yttria-stabilized zirconia within and surrounding nickel particles, thereby forming a yttria-stabilized zirconia "skeleton" within and around a matrix of nickel particles, such as described in U.S. Pat. No. 4,582,766. This process produces a fuel electrode that can generally meet the above-described technical properties, but which is quite expensive and time-consuming to manufacture. For example, such a process requires application of a room temperature nickel slurry followed by a costly high temperature EVD process.

In an effort to reduce fuel electrode manufacturing costs, sintering processes have been attempted, such as those described in U.S. Pat. Nos. 4,971,830, 5,035,962, 5,908,713 and 6,248,468. However, fuel electrodes applied by a sintering process are relatively time consuming in that it still requires at least two processing steps, an initial application followed by high temperature sintering. Moreover, sintered fuel electrodes may experience marginal physical stability over time.

Other attempts to reduce fuel electrode fabrication costs include plasma spraying (e.g. atmospheric plasma spraying "APS", vacuum plasma spraying "VPS", plasma arc spraying, flame spraying) which generally involves spraying a molten powdered metal or metal oxide onto an underlying substrate surface using a plasma thermal spray gun to form a deposited layer having a microstructure generally characterized by accumulated molten particle splats. Plasma spraying techniques are described in U.S. Pat. Nos. 3,220,068, 3,839,618, 4,049,841, and U.S. Pat. Nos. 3,823,302 and 4,609,562 generally teach plasma spray guns and use thereof, each of which are herein incorporated by reference in their entirety. Although plasma spraying has been used for fabrication of certain fuel cell layers, such as those described in U.S. Pat. Nos. 5,085,742, 5,085,742, 5,234,722 5,527,633 (plasma sprayed electrolyte) U.S. Pat. No. 5,426,003 (plasma sprayed interconnect), U.S. Pat. No. 5,516,597 (plasma sprayed interlayer) U.S. Pat. No. 5,716,422 (plasma sprayed air electrode) and Invention Registration No. H1260 (plasma sprayed air electrode, electrolyte and fuel electrode), use of such plasma spraying techniques have been of limited value when used to apply a fuel electrode onto an electrolyte because they tend to result in a fuel electrode that poorly adheres to the electrolyte and exhibits poor thermal cyclability due to the mismatch of thermal coefficients of expansion between the metal portion of the fuel electrode and the ceramic electrolyte. Moreover, these conventional plasma spraying techniques tends to result in a fuel electrode that has a low porosity after continued use, thereby causing voltage loss when current flows as a result of polarization due to a low rate of diffusion of fuel gases into and reaction product out from the interface between the fuel electrode and electrolyte.

There is thus a need for a fuel electrode and a method for making the fuel electrode that can generally achieve above-described favorable technical properties and can be applied onto an underlying electrolyte at a low cost.

SUMMARY OF THE INVENTION

The present invention provides a fuel electrode and a method for making the fuel electrode that can generally achieve above-described technical properties and can be manufactured at a low cost. The present invention also provides a method of plasma spraying a fuel electrode onto an electrolyte. The present invention also provides a one-step plasma spray process adapted to form an adherent, conductive, electrochemically active nickel-zirconia fuel electrode onto an electrolyte.

One aspect of the present invention thus involves a fuel cell comprising an air electrode; an electrolyte formed on at least a portion of the air electrode; and a plasma sprayed ceramic-metal fuel electrode formed on at least a portion of the electrolyte.

Another aspect of the present invention involves a method of manufacturing a fuel cell comprising providing an air electrode; arranging an electrolyte adjacent the air electrode; and plasma spraying a ceramic-metal fuel electrode powder onto at least a portion of the electrolyte with a plasma spray gun.

Further aspects, features and advantages of the present invention will become apparent from the drawings and detailed description of the preferred embodiments that follow.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

Overview

The invention described herein employs several basic concepts. For example, one concept relates to a fuel electrode that generally meets above-described technical properties and can be manufactured at a low cost. Another concept relates to a method to APS a fuel electrode onto an electrolyte. Another concept relates to a one-step plasma spray process adapted to form an adherent, conductive, electrochemically active nickel-zirconia fuel electrode onto an electrolyte having a long useful lifetime at operating fuel cell conditions.

The present invention is disclosed in context of use as a nickel-zirconia cermet fuel electrode of a tubular SOFC used within a power generation system. The principles of the present invention, however, are not limited to nickel-zirconia cermet fuel electrodes, tubular SOFCs, or power generation systems. For example, the principles of the present invention can be used with copper-zirconia cermet fuel electrodes, cobalt-zirconia cermet fuel electrodes, and the like. For another example, the principles of the present invention can be used with molten carbonate fuel cells, PEM fuel cells, phosphoric acid fuel cells, planar solid oxide fuel cells, monolithic solid oxide fuel cells, and the like. For another example, the principles of the present invention can be used with electrolysis cells, oxygen separation cells, fuel cell vehicle propulsion systems, fuel cell energy conversion systems, and the like. For another example, the principles of the present invention can be used with other fuel cell layers, such as cermet interlayers and the like. One skilled in the art may find additional applications for the apparatus, processes, systems, components, configurations, methods, and applications disclosed herein. Thus, the illustration and description of the present invention in context of an exemplary nickel-zirconia cermet fuel electrode of a tubular SOFC for use in a power generation system is merely one possible application of the present invention. However, the present invention has been found particularly suitable in connection with nickel-zirconia cermet fuel electrodes of tubular SOFCs for use in power generation systems.

Figure 1:
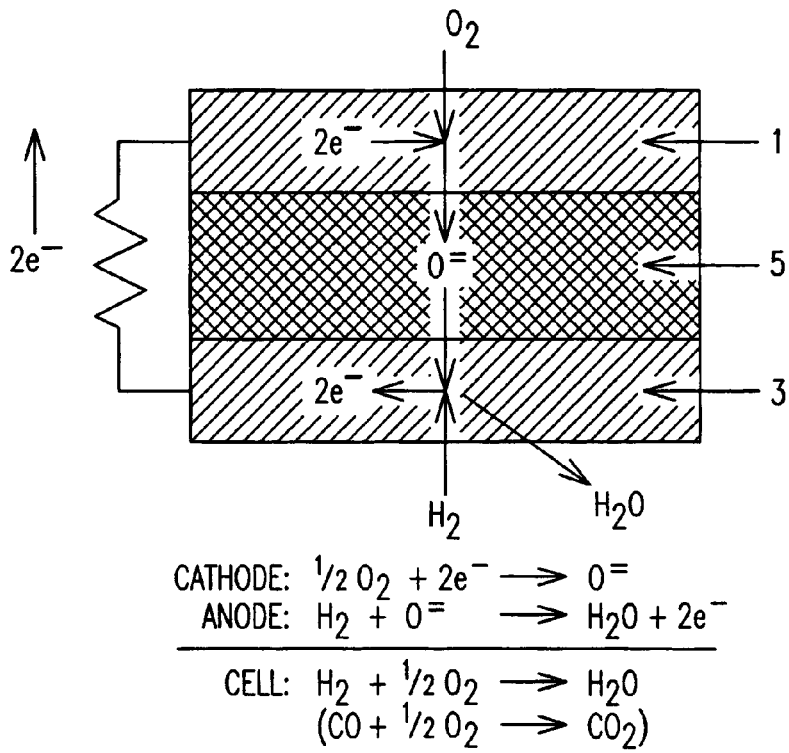
FIG. 1 is an illustration of an exemplary known electrochemical reaction within a fuel cell.
Figure 2:
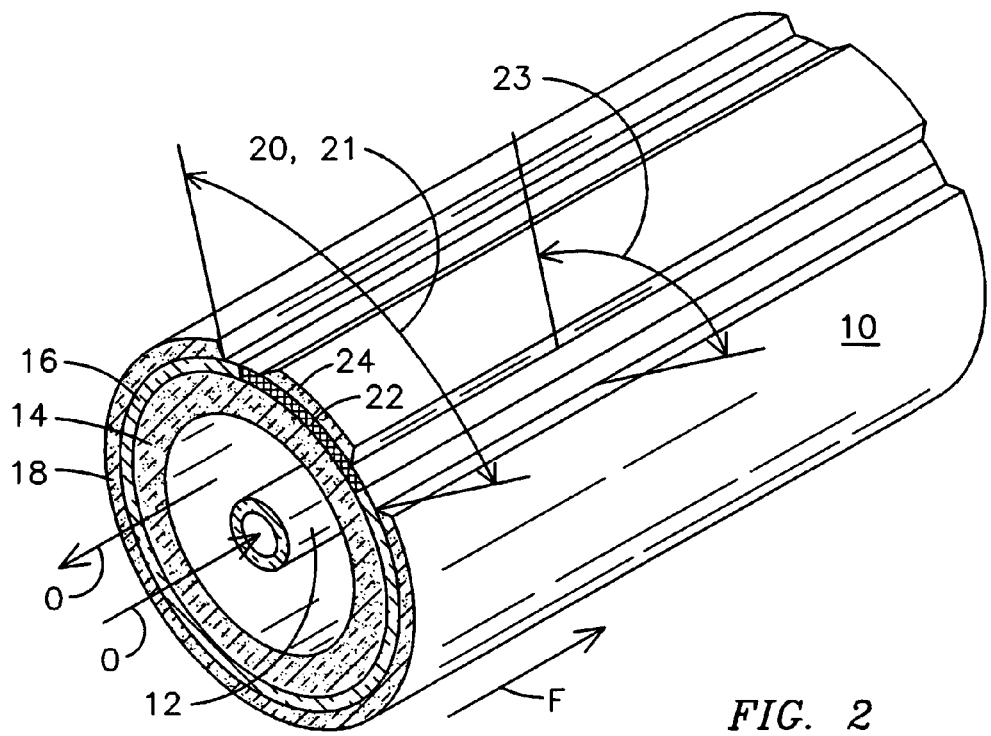
FIG. 2 is a perspective cut view of a portion of an exemplary tubular solid oxide fuel cell of the present invention.

Referring now to FIG. 2, the preferred tubular configuration is based upon a fuel cell system in which a flowing gaseous fuel F is directed axially over the exterior of the fuel cell 10, and a flowing gaseous oxidant $O_2$ is feed through an optional riser tube 12 positioned within the tubular air electrode 14 and which extends near a closed end of the air electrode 14 such that the oxidant $O_2$ flows out the riser tube 12 and along the interior length of the fuel cell 10. By this preferred tubular configuration, the fuel F is exposed to the fuel electrode 18 and the oxidant $O_2$ is exposed to the air electrode 14. Of course, other configurations can be used to expose fuel F to the fuel electrode 18 and oxidant $O_2$ to the air electrode 14.

Fuel Cell Components

Referring still to FIG. 2, an exemplary tubular solid oxide fuel cell 10 is shown. The fuel cell 10 comprises an air electrode 14 arranged adjacent to an electrolyte 16 which, in turn, is arranged adjacent to a fuel electrode 18.

The air electrode 14 advantageously comprises a relatively porous layer (e.g. about 5% to about 40% by volume porous, preferably about 25% to about 35% porous) capable of converting the oxidant $O_2$ to oxide ions under standard fuel cell operating conditions. The illustrated air electrode 14 has a generally self-supporting tubular configuration adapted for exposure to the oxidant $O_2$ and the electrolyte 16, however, other geometries can be used to provide such exposure. The exemplary air electrode 14 has a thickness of about 0.1 mm to about 5 mm, preferably about 1 mm to about 3 mm, and a length of about 0.1 m to about 10 m, preferably about 0.2 m to about 4 m. The air electrode 14 may be made of any electrochemically conductive material suitable to perform its oxidant ionization function, such as lanthanum manganite doped with one or more of Ca, Sr, Ce, and where one or more rare earth elements can be substituted for at least a portion of the La, and where one or more of Ni, Cr, Fe, Co, Mg can be substituted for at least a portion of the Mn. For example, $La_{1-x-y}Ca_xCe_yMnO_3$, wherein x can range from about 0.2 to about 0.6 and y can range from about 0.0 to about 0.2. Other suitable formulations may also be used, such as those found in U.S. Pat. Nos. 4,562,124, 5,106,706, 5,108,850, 5,342,704, 5,686,198, 5,916,700, and 5,932,146.

The electrolyte 16 advantageously comprises a relatively dense layer through which oxygen ions can migrate but oxygen gas cannot penetrate, thereby providing good ionic transfer, poor electron conductivity, and substantially gas-tight properties. The electrolyte 16 has a configuration that is generally similar to the air electrode 14 and adapted for exposure to the air electrode 14 and the fuel electrode 18. The illustrated electrolyte 16 forms a layer having a generally tubular configuration that at least partially surrounds the generally tubular air electrode 14, advantageously with an omitted axially extending radial segment 20 that provides for direct contact between the air electrode 14 and interconnect 22. The segment 20 preferably extends axially about the entire length of the interconnect 22 and radially about 5 mm to about 15 mm in width. The exemplary electrolyte 16 has a thickness of about 0.001 mm to about 1 mm, preferably about 0.01 mm to about 0.1 mm, and a length similar to the air electrode 14. The electrolyte 16 may be made of any material suitable to perform its ion migration and gas denial functions under fuel cell operating conditions, such as a solid oxides comprising rare-earth element stabilized zirconia doped with one or more elements such as Y or Sc. For example, $Zr_{1-x}Y_xO_z$, wherein x can range from about 0.13 to about 0.26, Z is less than about 2, and x and z are related by the general formula $z=2-x/2$. Other suitable formulations may also be used, such as those found in U.S. Pat. No. 4,609,562.

The fuel electrode 18 advantageously comprises a relatively porous layer (e.g. about 5% to about 50% by volume porous, preferably about 25% to about 35% porous) capable of electrochemically combining a hydrogen-bearing fuel F and oxygen ions to form water and electrons. An optional addition of about 1-5% $TiO_2$ are similar composition can be added to enhance conductivity. The fuel electrode 18 has a configuration that is generally similar to the air electrode 14 and adapted for exposure to the electrolyte 16 and the fuel F. The illustrated fuel electrode 18 forms a layer having a generally tubular configuration that at least partially surrounds the generally tubular electrolyte 16, advantageously with an omitted axially extending radial section 21. The illustrated section 21 is coextensive with the radial segment 22, but can have different radial or axial dimensions. The exemplary fuel electrode 18 has a thickness of about 0.001 mm to about 1 mm, preferably about 0.03 mm to about 0.3 mm, and a length similar to the air electrode 14. The fuel electrode 18 may be made of any suitable material to perform its fuel gas ionization and electron release function under fuel cell operating conditions, such as a cermet comprising one or a combination of Ni, Cu and Co with zirconia or a zirconia-ceria mixture or solid solution, doped with one or more elements such as Y, Sc and rare earth elements. A preferred composition is Ni/$(ZrO_2)_{0.92}(Y_2O_3)_{0.08}$. Other suitable formulations may also be used, such as those described in U.S. Pat. Nos. 4,597,170, 4,609,562, 4,847,172, 4,582,766, 4,971,830, 5,035,962, 5,908,713 and 6,248,468 and those described in more detail below.

Still referring to FIG. 2, an interconnect 22 can be arranged adjacent at least a portion of the air electrode 14 and at least a portion of the electrolyte 16 to transfer the chemically generated electricity from the fuel cell 10 to the overall power generation system 2. The interconnect 22 is preferably dense, electronically conductive and substantially stable in both reducing and oxidizing environments. The illustrated embodiment shows an interconnect 22 arranged along at least a portion of the segment 20 and preferably having a width no greater than the section 21, thereby forming a gap 23 between the fuel electrode 18 to inhibit electrical shorting with the fuel electrode. The interconnect 22 is preferably in direct contact with the air electrode 14 and the electrolyte 16, but radially separated from the fuel electrode 18 by the gap 23. The exemplary interconnect 22 has a thickness of about 0.01 mm to about 0.5 mm, preferably about 0.03 mm to about 0.1 mm, and a length similar to but slightly less than the air electrode 14. The interconnect 22 may be made of any suitable material to perform its electricity transfer function under fuel cell operating conditions, such as lanthanum chromite doped with one or more elements such as Ca, Sr, Mg, Ba, Co, Ni and Al. For example, $La_{1-x}M_xCr_{1-y}N_yO_3$ wherein M is Ca, Sr or Ba, and N is Mg, Co, Ni or Al, and x can range from about 0.06 to about 0.1, and y can range from about 0.075 to about 0.25. Other suitable formulations may also be used, such as those described in U.S. Pat. Nos. 4,631,238, 4,861,345, 5,143,751, 5,106,654, and 5,426,003.

A top conductive (e.g. nickel, nickel comprising) layer 24 can be deposited onto at least a portion of the interconnect 22 to complete fabrication of the fuel cell 10 and allow the fuel cell 10 to be connected to other fuel cells. The conductive layer 24 is formed on at least a portion of the segment 20 to maximize electrical transfer, but is advantageously radially narrower than the section 21 to provide at least one radial gap 23 that electrically separates the conductive layer 24 from the fuel electrode 18.

An optional interlayer (not shown) can be arranged between the air electrode 14 and the electrolyte 16 or interconnect 22 to inhibit diffusion or leaching of air electrode constituents, such as manganese, into the interconnect 22 during fuel cell operation, and to inhibit undesirable interactions between the air electrode 14 and electrolyte 16. Suitable interlayers are disclosed, for example, in U.S. Pat. Nos. 4,598,467 and 5,516,597. Other interlayers can also be used and arranged between other fuel cell 10 components, such as, for example, that disclosed in U.S. Pat. No. 6,139,985.

An optional support (not shown) can be used to support to one or more portions of the fuel cell 10. For example, a support tube can underlie the air electrode 14, such as that disclosed in U.S. Pat. No. 4,395,468, which is herein incorporated by reference in its entirety. A support tube may be advantageous if a non-selfsupporting, thin or weak layers of air electrode 14, electrolyte 16, and/or fuel electrode 18 are used.

Not shown are an other optional interlayers between the air electrode 14 and electrolyte 16 and between the fuel electrode 18 and electrolyte 16. These interlayers are useful in promoting electrochemical reactions at the interfaces, which enhances the operation and inhibits undesired interactions between components.

Fuel Cell Fabrication/Assembly

Still referring to FIG. 2, the air electrode 14 is preferably formed as a self-supporting tubular substrate layer. Suitable shaping techniques include extrusion, isostatic pressing, and sintering. For example, the processes described in U.S. Pat. Nos. 4,562,124, 5,106,706, 5,108,850, 5,342,704, 5,686,198, 5,916,700, and 5,932,146 can be used. Such an applied air electrode layer can be characterized as being relatively porous to allow oxygen to diffuse through the air electrode 14.

The interconnect 22 can then be formed onto the air electrode 14 by a variety of techniques, such as by masking all but the segment 20 and then applying the interconnect composition onto the substantially masked air electrode 14 by an APS, VPS, EVD, or sintering method. Interconnect 22 is thereby formed on the underlying air electrode 14.

The electrolyte 16 can then be formed onto the air electrode 14 by a variety of techniques, such as by removing the previously applied air electrode 14 masking, then masking a portion of the interconnect 22, and then applying the electrolyte composition onto the air electrode 14 by an APS, VPS, or EVD method, and the electrolyte may overlap the edges of the interconnect 22. By this exemplary method, the electrolyte 16 is formed on the underlying unmasked tubular air electrode 14 and exposed portions of the interconnect 22 edges which were not masked.

The fuel electrode 18 can then be applied onto the electrolyte 16 via an APS or VPS process, leaving a gap 23 to prevent contact with the interconnect 22, and to provide a layer that strongly adheres to the electrolyte 16 and remains suitably porous throughout fuel cell operation life. A similar masking technique can be used to form the fuel electrode 18 by other application techniques on the underlying electrolyte 16 excluding the section 21. As explained above, the fuel electrode 18 may be made of any suitable material to perform its fuel gas ionization and electron release function under fuel cell operating conditions, such as a cermet comprising one or a combination of Ni, Cu and Co with zirconia or a zirconia-ceria mixture or a solid solution, doped with one or more elements such as Y, Sc and rare earth elements, although other cermet compositions could be used. If a nickel-cermet composition is used, one such composition that has been found advantageous is formed by plasma spraying a mixture of nickel graphite powder (to provide the nickel, with the graphite burning out to provide additional porosity during subsequent processing and fuel cell operations) and yttria-stabilized zirconia powder (to provide the ceramic). Although, as will be understood by those skilled in the art, other nickel comprising compositions could be used to provide the nickel and other ceramic comprising compositions could be used to provide the ceramic. Also, dopants, additives or constituents, such as ceria or ceria doped with rare earth oxides, could be incorporated into or with the nickel cermet or individual nickel or ceramic particles.

If nickel graphite powder is used to provide the nickel, it has been found that a ratio of about 60% to about 85% nickel to about 15% to about 40% graphite is suitable, without regard to optional dopants or additives, and preferably about 70% to about 80% nickel to about 30% to about 20% graphite. One way to achieve this suitable ratio is by using graphite coated nickel particles, such as that commercially available from Praxair Inc., headquartered at 39 Old Ridgebury Road, Danbury Conn., as composition number A1-1052-1 and PWA 1352-1L. It has been found that the graphite burns off relatively easily during the APS and subsequent fuel cell fabrication processes and assists in attaining suitable fuel electrode porosity. An optional method involves using a mixture of nickel oxide and a stabilized zirconia.

If yttria-stabilized zirconia powder is used to provide the ceramic, it has been found that a ratio of about 8 mole percent to about 12 mole percent of $Y_2O_3$ with the remaining balance zirconia is suitable, without regard to optional dopants or additives, and preferably about 7 mole percent to about 10 mole percent $Y_2O_3$. One way to achieve this suitable ratio is by using fused and crushed yttria-stabilized zirconia particles, such as that commercially available from Muscle Schoals Mineral, Inc., as composition number MSM 278-1-1 and MSM 58-2-1.

The nickel and nickel-oxide comprising particles and the zirconia comprising particles can then be mixed or agglomerated by spray drying or other suitable means to provide a generally freely flowing plasma spray feed powder. If too little nickel or too much zirconia is used, the fuel electrode tends to exhibit poor electrical conductivity; whereas, if too much nickel or too little zirconia is used, then the fuel electrode tends to exhibit poor adherence or thermal cyclablity. It has been found that a ratio of about 60% to about 85% nickel to about 40% to about 15% zirconia is suitable, without regard to optional dopants or additives, and preferably about 70% to about 80% nickel to about 30% to about 20% zirconia. The feed powder preferably has a particle size and configuration to assist a uniform flow, provide consistent flow to the plasma spray gun, and provide a more homogenous applied microstructure. Dopants or additives can be incorporated into or with the cermet feed powder.

The feed powder is then plasma sprayed (e.g. by APS, VPS, flame spraying, and the like) onto at least a portion of the electrolyte 16, advantageously not onto the masked section 21, to form a generally uniform layer having a microstructure characterized by accumulated molten particle splats. Some background information for general plasma spray techniques can be found in U.S. Pat. Nos. 3,220,068, 4,049,841, 5,085, 742, and 5,426,003, and those skilled in the art will recognize and understand other general plasma spray techniques.

If an APS technique is used, it has been found that a suitable plasma spray can be generated by an arc discharge having a voltage of about 30 volts to about 60 volts, a current of about 400 amperes to about 900 amperes, and a power of about 10 kilowatts to about 40 kilowatts. The powder feed rate is advantageously about 6 grams/minute to about 30 grams/minute. A commercially available spray gun suitable to achieve these parameters is a Praxair Tafa Plasma Spray Gun, Model No. SG-100-730. The distance between the spray gun nozzle and the electrolyte layer 16 is about less than 4 inches, preferably about 2.5 inches to about 3.5 inches. The plasma should be directed substantially perpendicular to the electrolyte layer 16, since even low angle spraying tends to exaggerate the resultant porosity. It has also been found advantageous to direct traverse of the spray gun along the axial length of the fuel cell at a generally constant velocity of about 400 mm/sec to about 700 mm/sec, preferably about 550 mm/sec, and to have the electrolyte layer 16 make a plurality of passes or revolutions (e.g. 2-40) around the spray gun (or vice versa) to provide an overall fuel electrode layer of suitably uniform thickness.

Figure 3A:
FIG. 3A is an exemplary photograph of the microstructure of a plasma sprayed fuel electrode deposited onto an underlying APS electrolyte at 200× magnification.
Figure 3B:
FIG. 3B is an exemplary photograph of the microstructure of a plasma sprayed fuel electrode deposited onto an underlying APS electrolyte at 500× magnification.

Referring now to FIGS. 3A and 3B, two micrographs of a plasma sprayed fuel electrode 16 deposited onto an underlying APS electrolyte 14 are shown. A zirconia "skeleton" 26 formed within and around the matrix of nickel particles 28 is readily seen.

Figure 4:
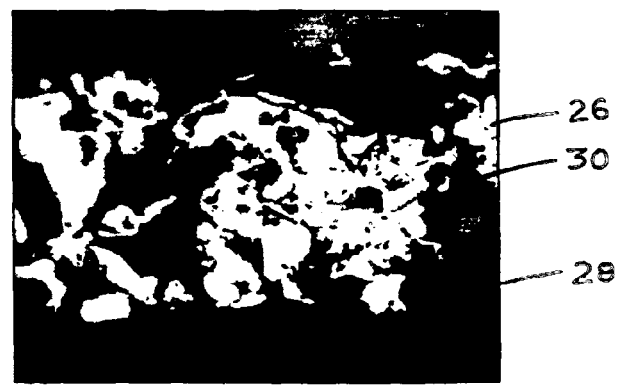
FIG. 4 is another exemplary photograph of the microstructure of a plasma sprayed fuel electrode deposited onto an underlying EVD electrolyte, with a precursor layer arranged between the fuel electrode and electrolyte at 1000× magnification.

Referring to FIG. 4, a micrograph of a plasma sprayed fuel electrode 16 deposited onto an underlying EVD electrolyte 14 is shown. Another zirconia "skeleton" 26 is formed within and around the matrix of nickel particles 28 is readily seen. In this embodiment, a thin precursor layer 30 comprising zirconia (e.g. zirconia stabilized by about 6% to about 12% yttria and/or other rare earth elements, and optionally doped with $TiO_2$, $CeO_2$, or other dopants) is applied onto the electrolyte 16 by a plasma spray process to provide a surface texture that is generally more porous and rougher than the underlying electrolyte 16. The precursor layer 30 assists in the subsequent deposition and adhesion of the fuel electrode 18. Use of the precursor layer 30 has been found particularly advantageous if the electrolyte 16 is applied by an EVD process, since an EVD electrolyte 16 tends to be very smooth. Thus, the relatively rougher and more thermally compliant precursor layer 30 tends to provides a better underlying surface for the fuel electrode 18 to adhere. If used, the precursor layer 30 advantageously has a thickness of about 1 micron to about 80 microns, preferably about 5 microns to about 20 microns. Additionally, if a copper comprising (rather than nickel comprising) cermet fuel electrode 18 is used, the precursor layer 30 additionally inhibits the copper from penetrating into the air electrode 14 and thereby short-circuiting the fuel cell 10.

Figure 5:
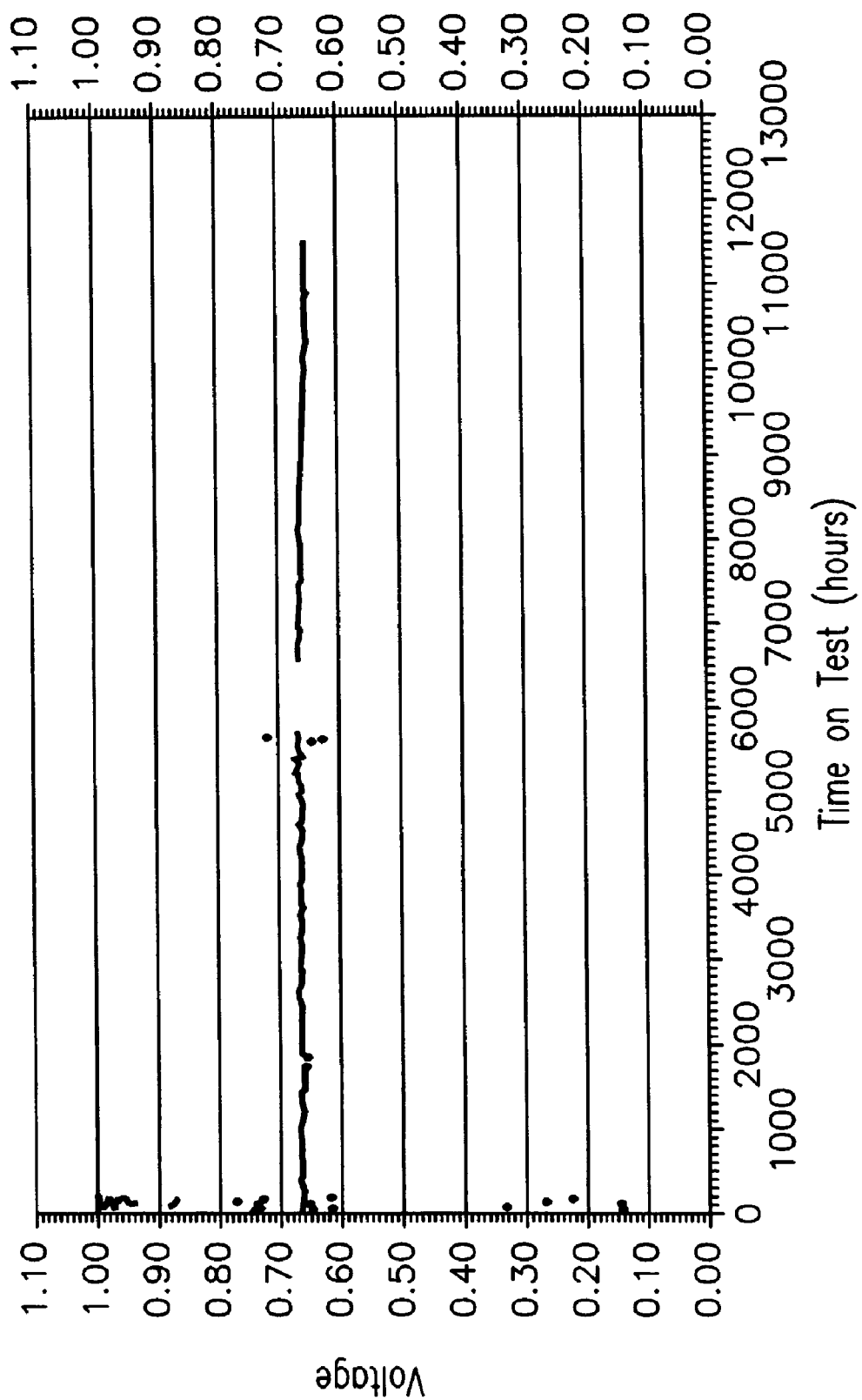
FIG. 5 is a graph showing stable operation of an exemplary fuel cell running at about 300 mA/cm$^3$ for over 11,000 hours.

FIG. 5 is a graph showing stable operation of an exemplary fuel cell of the present invention, the fuel cell running at about 300 mA/cm³ for over 11,000 hours with fifteen thermal cycles and at 1000° C. The long running time and ability to thermal cycle are particularly useful.

Fuel Cell Power Generation System

Figure 6:
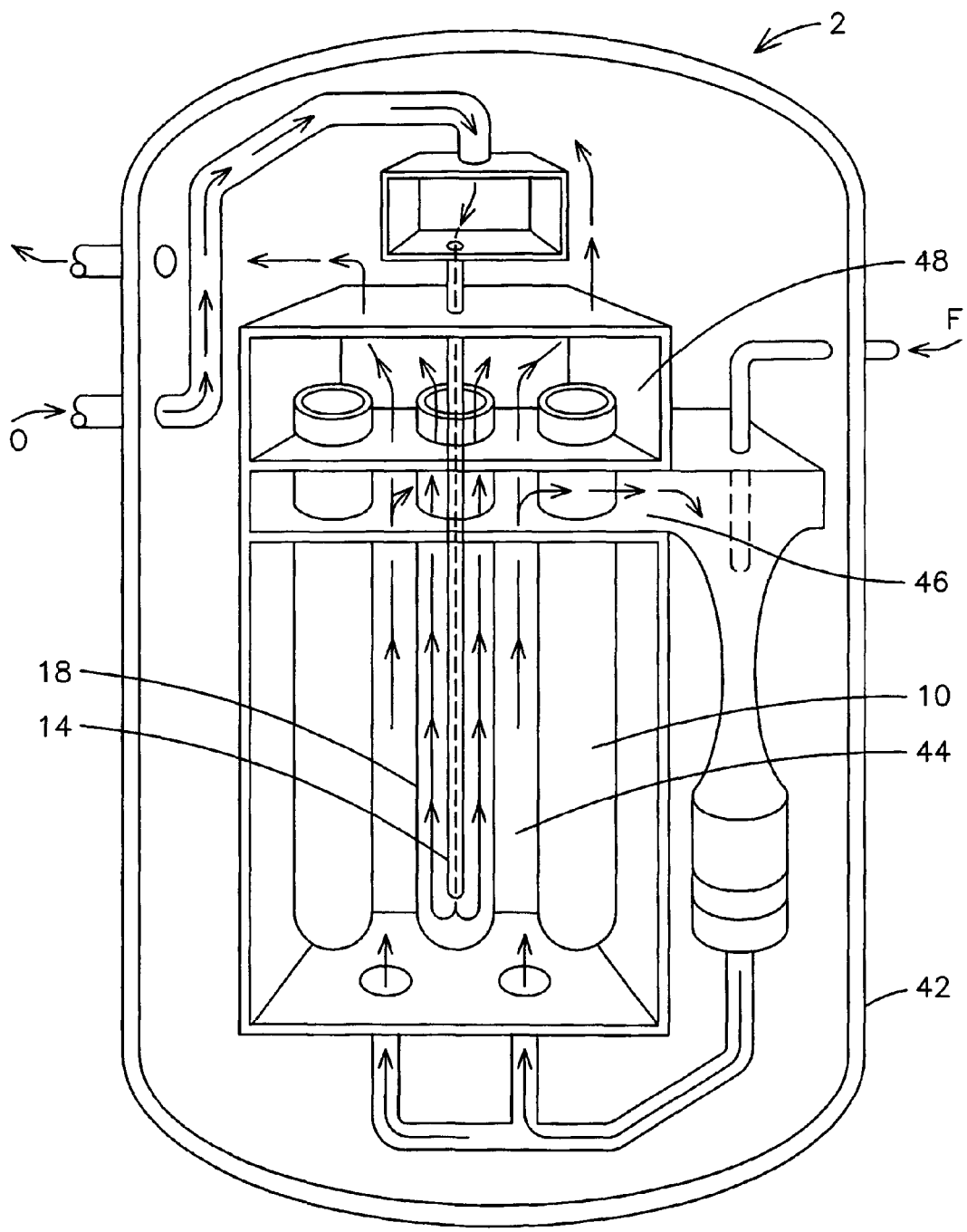
FIG. 6 is a schematic view of an exemplary solid oxide fuel cell electrical power generation system.

Referring now to FIG. 6, an exemplary solid oxide fuel cell (SOFC) power generation system 2 is shown. A plurality of individual fuel cells 10 are bundled or otherwise interconnected by a conductor such as a metal, metal-based or conductive plate, fiber, felt or interconnect to provide a desired system voltage and current, such as that described in U.S. Pat. No. 4,395,468, previously incorporated by reference. A suitable fuel cell interconnection technique involves bundling the fuel cells in series and/or parallel into one or more electrically interconnected arrays and/or submodules.

The exemplary system 2 comprises a housing 42 that contains a fuel inlet or generating chamber/section 44, a combustion product or preheating chamber/section 46, and an oxidant or air inlet chamber/section 48. As will understood by those skilled in the art, the exemplary illustrated system can use more or less than the three chambers/sections, and can combine or divide the functionality of the three chambers/sections.

The illustrated fuel cells 10 extend from the air inlet chamber 48 to the generating chamber 44, with an open end in the air inlet chamber 48 and a closed end in the generating chamber 44, and the air electrode 14 on the inner periphery and the fuel electrode 18 on the outer periphery.

The oxidant O advances through the air inlet and preheating chambers 48, 46 and into the generating chamber 44, where $O_2$ is introduced to the air electrode portion of the fuel cell 10. Meanwhile, the fuel F advances into the generating chamber 44 and is introduced to the fuel electrode 18 portion of the fuel cell 10. The oxidant $O_2$ and fuel F then undergo the previously described electrochemical reaction within the fuel cell 10. The reaction products, and any depleted oxidant O and fuel F, are then discharged and partially recycled from the generating chamber 44 and partially burned in the combustion product chamber 46, where they can be discharged from the system, recycled to preheat the incoming oxidant or fuel, or used for other purposes such as powering a steam turbine, and the like.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. A tubular solid oxide fuel cell, comprising:
   an air electrode;
   an electrolyte formed on at least a portion of the air electrode; and
   a ceramic-metal fuel electrode comprising nickel and zirconia and having a microstructure characterized by accumulated molten particle splats formed on at least a portion of the electrolyte,
   wherein a nickel graphite powder is used to obtain at least a portion of the nickel.

2. The fuel cell of claim 1, wherein the nickel graphite powder comprises at least 60% nickel and at least 15% graphite.

3. The fuel cell of claim 2, wherein the nickel graphite powder comprises at least 70% nickel and at least 20% graphite.

4. A tubular solid oxide fuel cell, comprising:
   an air electrode;
   an electrolyte formed on at least a portion of the air electrode; and
   a ceramic-metal fuel electrode comprising nickel and zirconia and having a microstructure characterized by accumulated molten particle splats formed on at least a portion of the electrolyte,
   wherein a yttria stabilized zirconia powder is used to obtain at least a portion of the zirconia.

5. The fuel cell of claim 4, wherein the yttria stabilized zirconia powder comprises at least 7 mole percent of yttria.

6. The fuel cell of claim 5, wherein the yttria stabilized zirconia powder comprises at least 8 mole percent of yttria.

* * * * *